United States Patent

[11] 3,624,286

[72] Inventors Douglas Robert Bosomworth
Hightstown;
Zoltan Joseph Kiss, BelleMead, both of N.J.

[21] Appl. No. 875,078
[22] Filed Nov. 10, 1969
[45] Patented Nov. 30, 1971
[73] Assignee RCA Corporation

[54] NOISE CANCELLATION IN VIDEO SIGNAL-GENERATING SYSTEMS
13 Claims, 8 Drawing Figs.

[52] U.S. Cl. 178/7.2, 178/DIG. 12, 178/DIG. 28, 178/6.7 A
[51] Int. Cl. H04n 5/36
[50] Field of Search 178/7.2 D, 7.6, 6.7 A, 7.2 B, 6.8, 7.1, 7.2, DIG. 12, DIG. 28

[56] References Cited

UNITED STATES PATENTS

| | | | |
|---|---|---|---|
| 2,965,711 | 12/1960 | James et al. | 178/6.6 A |
| 2,979,622 | 4/1961 | Garbundy | 178/6.8 |
| 3,265,812 | 8/1966 | Essinger et al. | 178/7.2 |

*Primary Examiner*—Robert L. Griffin
*Assistant Examiner*—John C. Martin
*Attorney*—Eugene M. Whitacre ABSTRACT: A transparent optically recorded subject is scanned by light produced by electron beam excitation of a phosphor screen, the light transmitted through the subject being modulated in intensity proportionately (1) to the desired subject representative video signal and (2) to undesired noise effects inadvertently produced by the phosphor screen excitation. The light derived from the phosphor screen and the subject is divided by a semireflecting mirror, which may be a dichroic device, and the light transmitted through the mirror and modulated proportionately to both the desired video signal and the undesired noise effects is directed to a first detector to produce a first signal representative of such light, while the light reflected by the mirror and modulated substantially only by the undesired noise effects is directed to a second detector to produce a second signal representative of the noise effects. The first and second signals are applied to a third detector which functions to determine the ratio of the first and second signals and to produce an output signal including substantially only the desired subject representative video signal. In one embodiment, the subject is a photographic transparency and the semireflecting mirror is located between the subject and a flying spot cathode-ray tube scanner. In another embodiment, the subject is a record made by a video signal modulated electron beam bombardment of a cathodochromic layer of a cathode-ray tube which also has, behind the cathodochromic layer, a light-producing phosphor layer which is scanned by an unmodulated electron beam, the first and second detector means comprising photomultipliers which, together with a dichroic semireflecting mirror and at least the screen of the cathode-ray tube, are enclosed in a light-tight structure which includes two hollow frustoconical internally reflecting light-conducting members located to direct light respectively transmitted and reflected by the dichroic mirror to the first and second photomultipliers respectively.

INVENTORS
DOUGLAS R. BOSOMWORTH,
and ZOLTAN J. KISS.
BY William H. Meagher
ATTORNEY INVENTORS
DOUGLAS R. BOSOMWORTH
and ZOLTAN J. KISS
BY William H. Meagher
ATTORNEY INVENTORS
DOUGLAS R. BOSOMWORTH,
and ZOLTAN J. KISS.
BY William H. Meagher
ATTORNEY INVENTORS
DOUGLAS R. BOSOMWORTH
and ZOLTAN J. KISS
BY William H. Meagher
ATTORNEY INVENTORS
DOUGLAS R. BOSOMWORTH,
and ZOLTAN J. KISS.
BY William H. Meagher
ATTORNEY INVENTORS
DOUGLAS R. BOSOMWORTH
and ZOLTAN J. KISS
BY William H. Meagher
ATTORNEY

NOISE CANCELLATION IN VIDEO SIGNAL-GENERATING SYSTEMS

The invention described herein was made in the performance of work under a NASA contract and is subject to the provisions of Section 305 of the National Aeronautics and Space Act of 1958, Public Law 85–568 (72 Stat. 435; 42 U.S.C. 2457).

In the generation of subject representative video signals by the use of flying spot scanners and other related cathode-ray tubes the generated signal includes not only the desired video signal modulation but also undesired noise effects modulation inadvertently produced by the scanning apparatus. These undesired noise effects may be produced by one or more of a number of factors such as (1) variations in the current intensity of the nominally unmodulated electron beam by which the light-producing phosphor screen of the cathode-ray tube is scanned; (2) spatial nonuniformities in the thickness of the phosphor screen; and (3) spatial variations in the light emission efficiency of the phosphor screen. The intensity of the light emitted by such a phosphor screen may be represented by the expression $AN(t)$ where A is a constant and $N(t)$ is a time dependent noise factor.

Video signal generating systems of the character to which the present invention pertains employ a subject in the form of an optical record through which unmodulated light is transmitted in inverse proportion to the density (i.e., opacity) of the record which varies spatially to represent the subject and, neglecting the noise factor, may be represented by the expression $D(t)$. Hence, the intensity of the light transmitted through the optical subject is a combination of the desired subject representative component and the undesired noise effects component and may be expressed as $AN(t)D(t)$. The conversion of such light by detector means, such as a photomultiplier for example, into an electrical signal will produce a video signal which, if used in such form, will reproduce an image of the subject that will be marred by the concomitant reproduction of the objectionable noise effects.

It, therefore, is an object of the invention to provide novel apparatus by which to effectively eliminate from a video signal generated by facilities operating on the flying spot scanning principle undesired noise effects which may be inadvertently produced by such facilities.

The novel apparatus embodying the invention includes first and second detector means responsive respectively to (1) light including both a subject representative component and a noise effects component and (2) light representing substantially only the noise effects component to produce corresponding first and second signals. The first and second light representative signals produced respectively by the first and second detector means are impressed upon third detector means which is responsive to the ratio of the first and second signals to produce an output signal which includes substantially only the desired subject representative video signal.

In one illustrative embodiment of the invention, the light which is directed through the optically recorded subject in the form of a photographic transparency is derived from a cathode-ray tube having a layer of phosphor material on the inside of its faceplate and which is scanned by an unmodulated electron beam. In this embodiment, a semireflecting mirror, serving as a light divider, is located between the cathode-ray tube and the subject transparency so as to transmit to the first detector means both subject representative and noise effects representative light components, and to reflect to the second detector means only the light component representative of the noise effects.

In another illustrative embodiment of the invention, the subject is recorded on a layer of cathodochromic material on the inside of the faceplate of a cathode-ray tube which also includes a phosphor layer behind the cathodochromic layer. In this embodiment, the light divider is a dichroic device located outside of the cathode-ray tube and is of a character to transmit both subject representative and noise effects representative light components to the first detector means and to reflect substantially only the noise effects representative light component to the second detector means. Also, in this embodiment, the light transmitted and reflected by the dichroic device is conducted to the respective detector means by individual hollow internally reflecting members which, preferably have frustoconical configurations.

For a more specific disclosure of the invention reference may be had to the following detailed description of two illustrative embodiments thereof which is given in conjunction with the accompanying drawings, of which:

Figure 5:
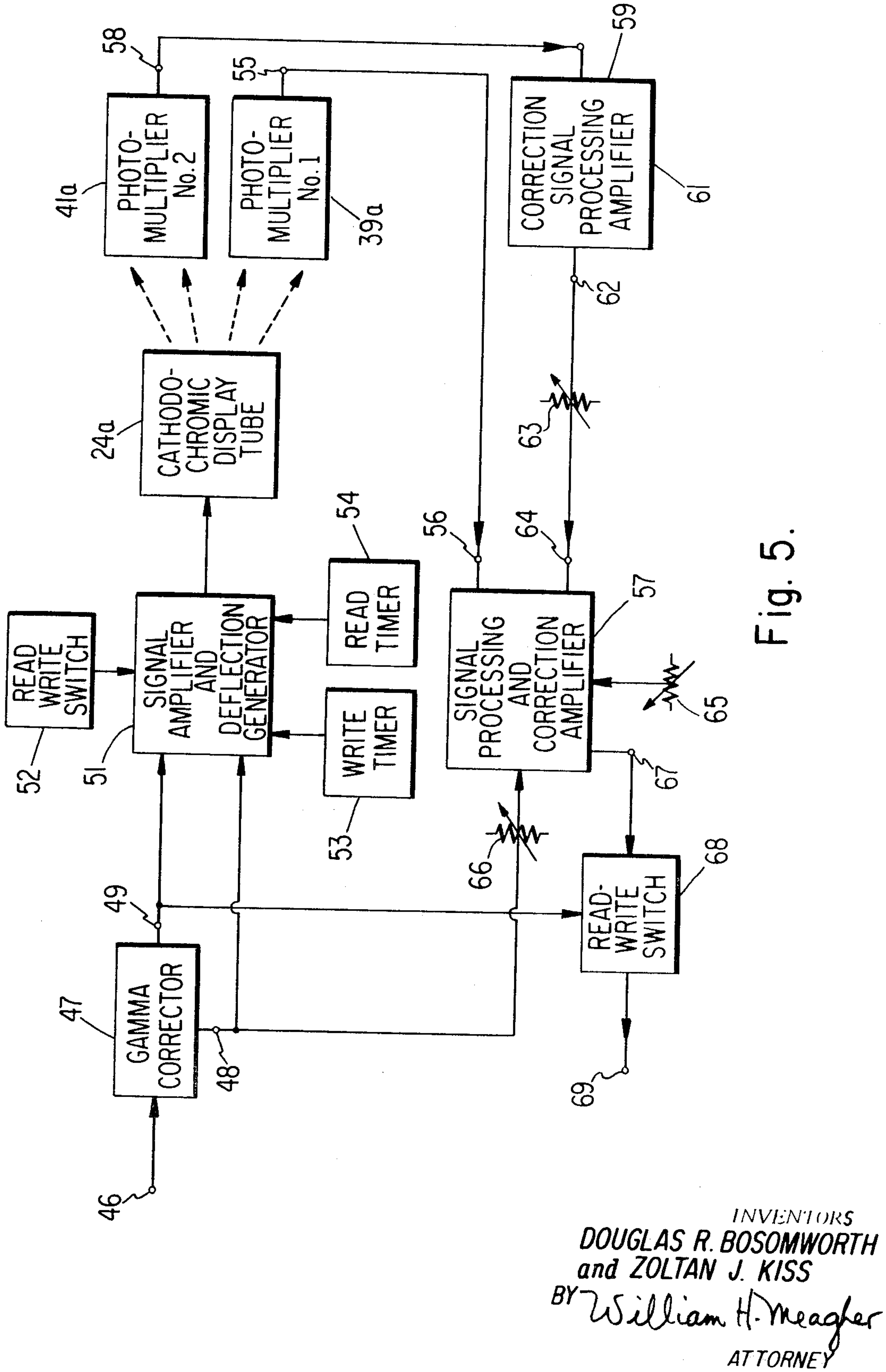
FIG. 5 is a block diagram of a typical signal system by which a subject may be recorded on a cathode-ray tube of the kind shown in FIG. 2 and by which representative video signals may be produced therefrom by means of the invention.
Figures 7, 8:
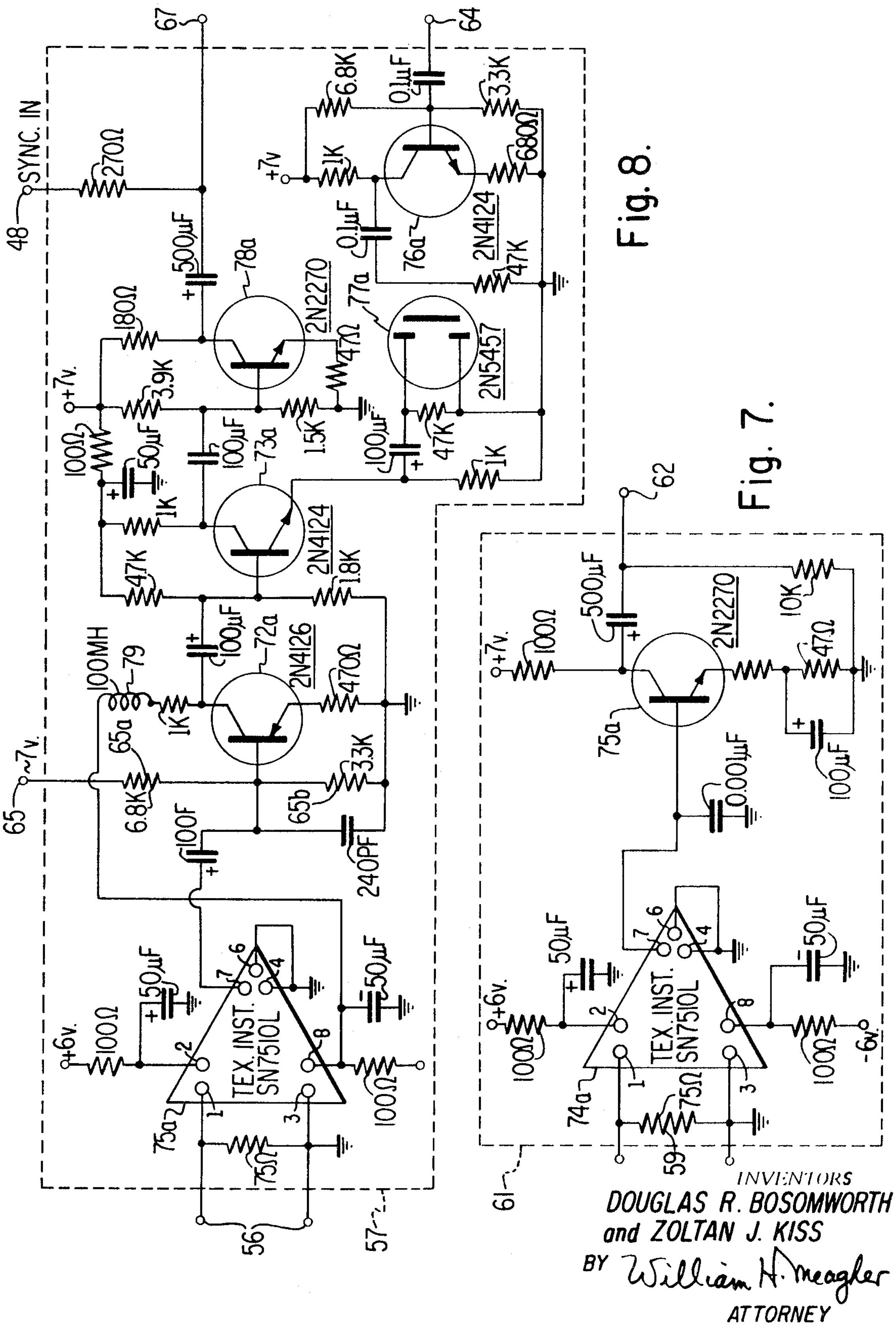

FIG. 7 is a schematic circuit diagram of the processing amplifier for the signal from photomultiplier No. 2 of FIG. 5 and which comprises the undesired noise effects components; and FIG. 8 is a schematic circuit diagram of the processing amplifier for the composite signal derived from photomultiplier No. 1 of FIG. 5 and which includes both the desired video signal component and the undesired noise effects component.

Figure 1:
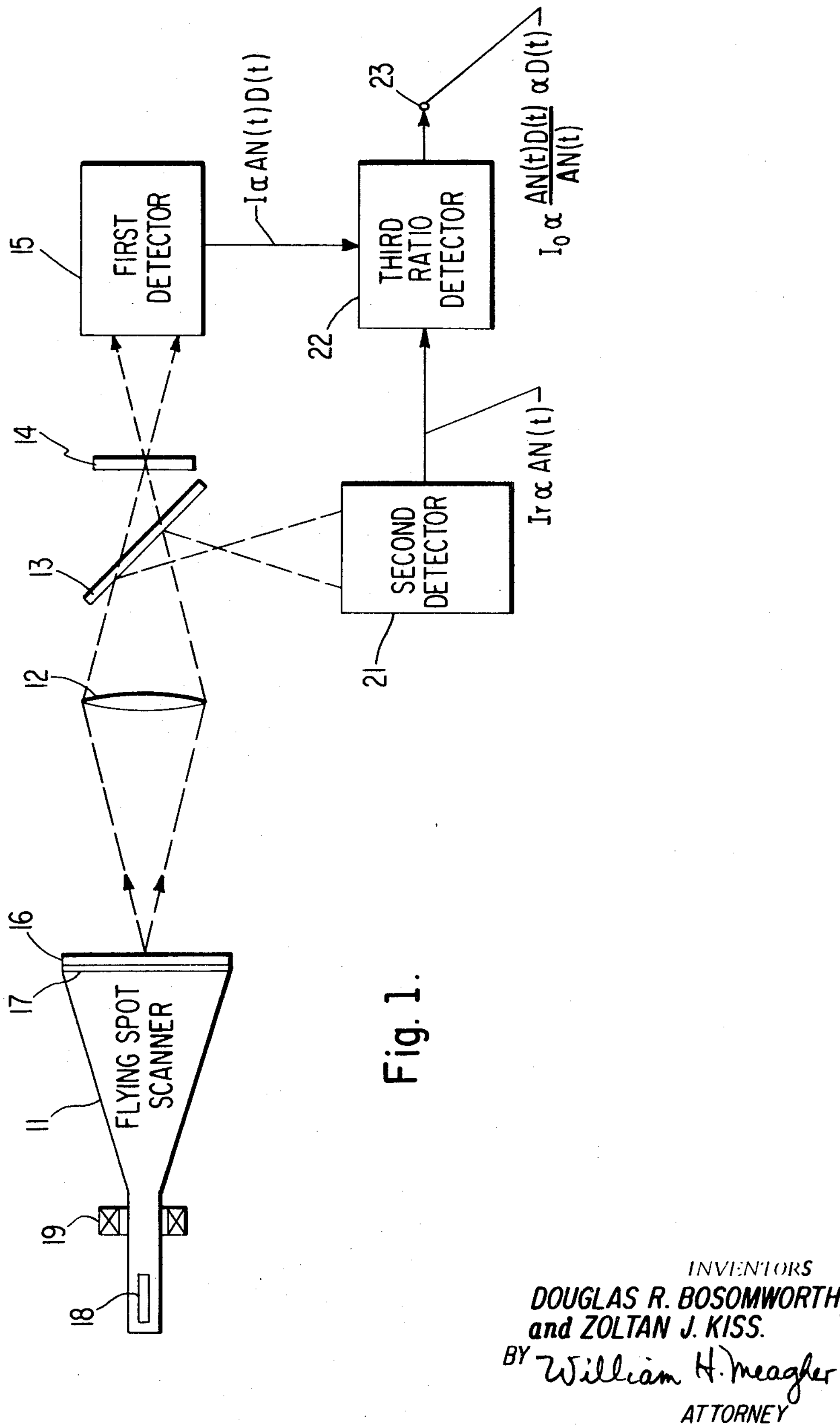
FIG. 1 is a diagrammatically illustrated arrangement of an embodiment in which a flying spot scanner is used to direct light through a photographic transparency.

In FIG. 1 light from flying spot scanning apparatus comprising a cathode-ray tube 11 is projected by an optical system including a lens 12 and a semireflecting mirror 13 through a subject photographic transparency 14 to a first detector 15. The flying spot scanner tube 11 has a faceplate 16, on the inside of which is a phosphor layer 17 capable of emitting light of a substantially uniform spatial intensity when excited by an unmodulated electron beam derived from an electron gun 18 by a conventionally driven deflection yoke 19. Light from the flying spot scanner tube 11 which is reflected by the semireflecting mirror 13 is directed to a second detector 21. The light impinging upon the first detector 15 is modulated in intensity both by the optical density of the subject transparency 14 and by the noise effects included in the light derived from the flying spot scanner tube 11. Thus, the composite signal I produced by the first detector 15 is proportional to the expression $AN(t)D(t)$ in which A is a constant, $N(t)$ is a signal component corresponding to the time dependent noise effects light factor, and $D(t)$ is a signal component corresponding to the time dependent subject representative light. The signal $I_r$ produced by the second detector 21, however, is proportional to the expression $AN(t)$ which is the same as the noise effects signal component in the output composite signal I of the first detector 15.

The described signal outputs I and $I_r$, respectively, of the first and second detectors 15 and 21 are impressed upon a third detector 22 which functions to produce, at an output terminal 23, a video output signal $I_o$ which is proportional to the expression $D(t)$ which represents the ratio of the composite signal I, corresponding to the expression $AN(t)D(t)$, derived from the first detector 15 and the noise effects signal $I_r$, corresponding to the expression $AN(t)$, derived from the second detector 22. Thus, by means of the described embodiment of the invention, any component representing undesired noise effects in the light used to scan the optically recorded subject is effectively eliminated from the desired output subject representative video signal.

It is to be noted that (by the nature of its described origins) the noise effects factor N($t$) of the light derived from the flying spot scanner tube 11 is the same for all wavelengths of radiation emitted by the phosphor layer 17 when excited by the electron beam from the gun 18. Hence, the plain semireflecting mirror 13 may be beneficially replaced by an appropriate dichroic device of a character to transmit to the first detector 15 a first frequency spectrum of the radiation from the phosphor layer 17 and to reflect to the second detector 21 a second frequency spectrum of the phosphor layer radiation. Such an arrangement is particularly useful when the optically recorded subject 14 is a color transparency. Phosphor emission of an incorrect color, for example, which otherwise would be filtered out and wasted can be preserved to function in the development of a reference signal $I_r$ by which to enhance the signal-to-noise ratio of the desired output signal $I_o$ at the output terminal 23 of the third (ratio) detector 22.

Figure 2:
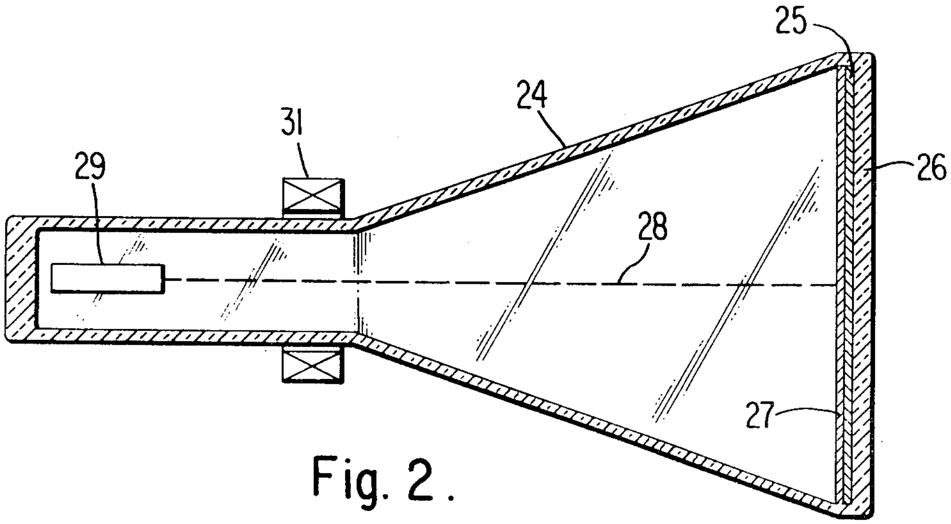
FIG. 2 is a cross-sectional representation of a cathode-ray tube having a cathodochromic layer serving to optically record the subject and a phosphor layer to supply illumination of the recorded subject.

Another embodiment of the invention employs a combined memory and display device, a diagrammatic cross section of which is shown in FIG. 2. This device of the same general character as that disclosed in a copending application of James C. Miller and Charles M. Wine, Ser. No. 700,143, filed Jan. 14, 1969, and and entitled"Dark Trace Cathode Ray tube with Selective Erasing Means." The cathode ray tube 24 of the FIG. 2 has a target electrode including a layer of cathodochromic material 25 on the inside of its faceplate 26 and a layer of phosphor (i.e., cathodoluminescent) material 27 on the inside of the cathodochromic layer. The cathodochromic layer 25 is normally white and translucent but is subject to being darkened in a particular color when bombarded by electrons, the degree of darkening being dependent upon the magnitude of the electron bombardment and the bombarded areas remaining darkened after cessation of the electron bombardment. An optical record of a subject may be stored in the cathodochromic layer 25 by scanning it with an electron beam 28 which is derived from an electron gun 29 and deflected in a conventional manner by means including a yoke 31 and the current magnitude of which is modulated by a video signal representative of the subject to be recorded.

In order to store an optical record in the cathodochromic layer 25 in the manner described, it is necessary that the electron beam 28 have a relatively high current intensity and a velocity of sufficient magnitude to completely penetrate the phosphor layer 27. Such a beam will be referred to herein as a "writing" beam. The image so stored in the cathodochromic layer 25 is analogous to the photographic transparency 14 of FIG. 1. In order to convert the image stored in the cathodochromic layer 25 of the tube 24 into representative video signals having a relatively high signal-to-noise ration and employing the principle of the invention as disclosed with reference to FIG. 1, the electron beam 28 is reduced to a relatively low intensity sufficient only to appreciably excite only the phosphor layer 27 for light emission. The low intensity beam is unmodulated and is directed by means including a yoke 31 to scan the polymer layer 27, and such a beam will be referred to herein as a "reading" beam. This, in a manner generally similar to the operation of the apparatus of FIG. 1, the light which is produced by the phosphor layer 27 when excited by the reading electron beam is spatially modulated by its passage through the cathodochromic layer 25 and is subsequently divided into (1) light representative of the subject plus noise effects and(2) light representative substantially only of the noise effects for impression upon respective detectors, the signal outputs of which are ratio detected to produce an output video signal substantially free of noise effects.

Figure 3:
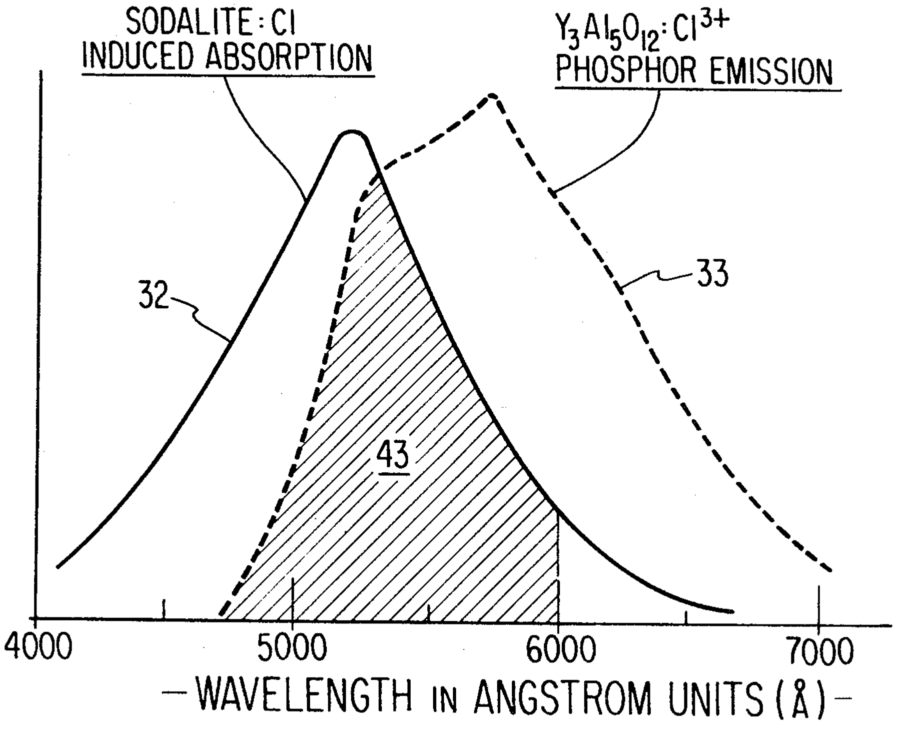
FIG. 3 depicts curves representing the frequency spectra of light absorption and emission respectively of the cathodochromic and phosphor layers of the cathode-ray tube of FIG. 2.

In the case of the cathode-ray tube 24 of FIG. 2, however, the light division cannot be effected before the light from the phosphor layer 27 traverses the cathodochromic layer 25 in which the subject is recorded. The ratio detecting principle embodied in the apparatus of FIG. 1, however, can also be used in conjunction with the apparatus of FIG. 2 by proper choice of the materials of which the cathodochromic and phosphor layer 25 and 27 are made. It is necessary that the materials chosen for the phosphor layer 27 be capable of appreciable light emission in a frequency spectrum outside of the induced light absorption spectrum of the material chosen for the cathodochromic layer 25. FIG. 3 illustrates the frequency spectrum relationship of a particular combination of materials for the respective cathodochromic and phosphor layers 25 and 27. The solid line curve 32 illustrates the induced light absorption by the indicated material used for the cathodochromic layer 25 and the broken line curve 33 illustrates the spectrum of light emission by the indicated material used for the phosphor layer 27. It is to be noted that the light emission curve 33 overlaps the induced absorption curve 32 in the spectrum from approximately 5,000 to 6,000 Angstrom units. Any light radiation from the phosphor layer 27 at wavelengths less than approximately 6,000 Angstrom units is capable of being absorbed in the cathodochromic layer 25 in direct proportion to the local induced optical density of the layer produced by its earlier scansion by the writing beam. Such light issuing from the target electrode of the cathode-ray tube 24 is spatially modulated by both the desired subject information and by the undesired noise effects, and can be used for projection onto detector means to develop an I signal corresponding to a similar signal described with reference to FIG. 1.

Also, as may be seen in FIG. 3, the light radiation from the phosphor layer 27 of FIG. 2 at wavelengths greater than approximately 6,000 Angstrom units is not absorbed in the cathodochromic layer 25 of FIG. 2. Such light issuing from the target electrode of the cathode-ray tube 24 is spatially modulated substantially only by the undesired noise effects and can be used for projection onto detector means to develop an $I_r$ signal corresponding to a similar signal described with reference to FIG. 1.

Figure 4:
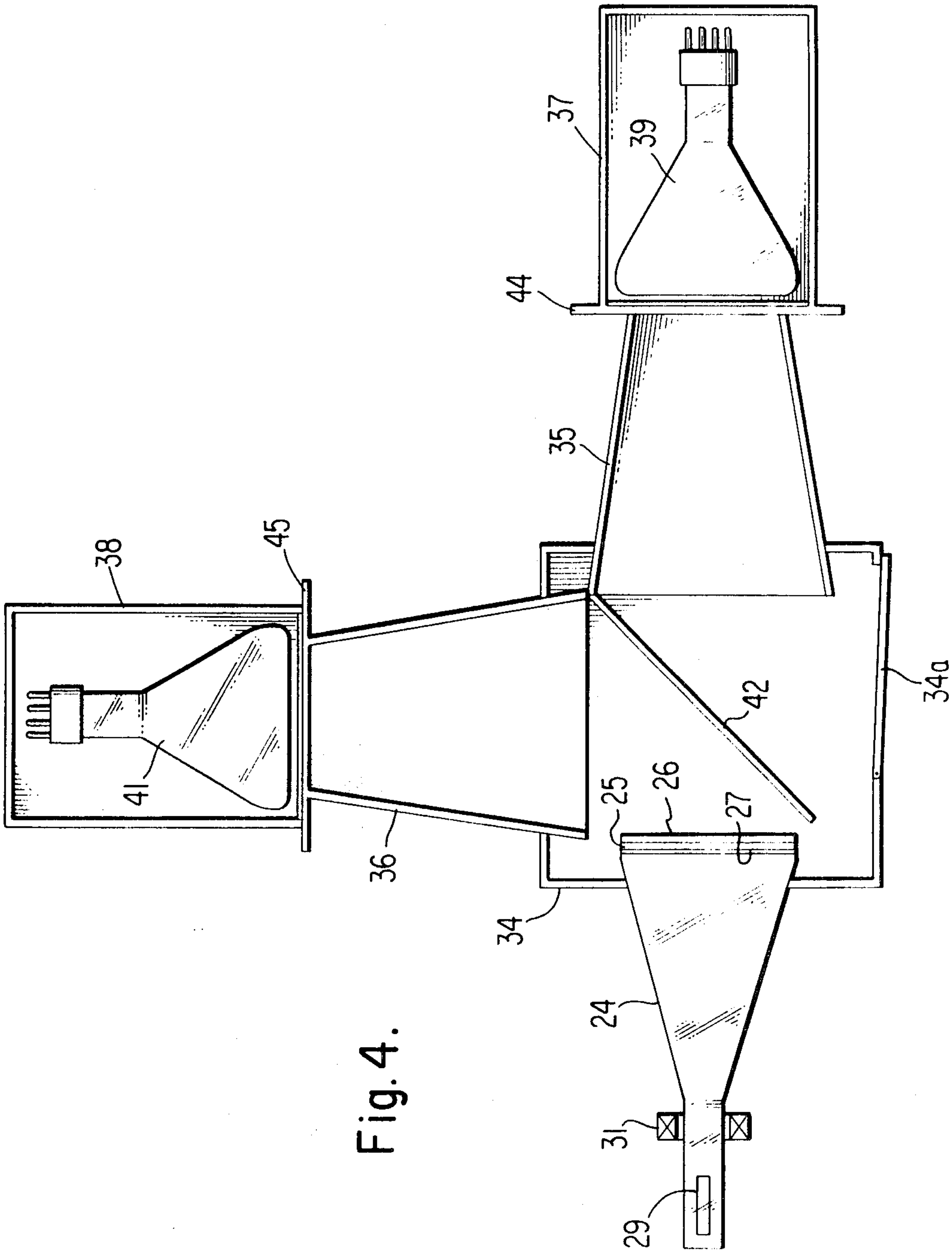
FIG. 4 is a diagrammatically illustrated arrangement of an embodiment incorporating the cathode-ray tube of FIG. 2.

FIG. 4 illustrates one manner in which a cathode-ray tube of the type shown in FIG. 2 may be used in a system embodying the principles of this invention. At least the target electrode of the cathode-ray tube 24 is enclosed within a chamber 34 of a light-tight structure which also includes two hollow internally reflecting frustoconical members 35 and 36 and compartments 37 and 38. The compartments 37 and 38 respectively house photomultipliers 39 and 41 serving as the detector means corresponding to the first and second detectors 15 and 21 respectively of FIG. 1. The frustoconical members 35 and 36 are internally reflective and serve to conduct light to the respective photomultipliers 39 and 41. A dichroic device 42 is mounted in the chamber 34 at a 45 degree angle to the faceplate 26 of the cathode-ray tube 24 and to the large openings of the frustoconical light conducting members 35 and 36, the small openings of which are respectively adjacent the photomultipliers 39 and 41. The dichroic device 42 is of a character to transmit from the cathode-ray tube 24 radiation generally represented by the crosshatched area 43 of FIG. 3 and to reflect radiation from the tube having longer wavelengths. In this way the radiation transmitted to the photomultiplier 39 will be strongly modulated by the image stored in the cathodochromic layer 25 of the tube 24 while the radiation reflected to the photomultiplier 41 will have a minimum if any, image modulation. The radiation from the cathode-ray tube 24 which is received by both photomultipliers, however, will include the undesired noise effects produced by the phosphor layer 27 as previously described. The signal representing such noise effects and produced by both photomultipliers can be eliminated from the desired video signal representing the image stored in the cathodochromic layer 25 by the ratio-detecting technique according to the invention.

In order to effect optimum efficiency in the operation of the apparatus embodying the invention it is important that the optical system which is used to transfer light from the cathode-ray tube 24 to the photomultipliers 39 and 41 be one which is highly efficient. The apparatus of FIG. 4 employing the frustoconical internally reflecting members 35 and 36 constitutes such a system. It takes advantage of the fact that it is not necessary, in a flying-spot-scanning-type of video signal generating system, to transmit to the photomultipliers 39 and 41 a true replica of the image produced at the faceplate 26 of the cathode-ray tube 24. It merely is necessary to collect a maximum amount of the light produced by the electron beam scansion of the phosphor layer 27 and transmitted through the cathodochromic layer 25 in which the image is stored. The frustoconical reflecting members 35 and 36 function to collect approximately an *f*/1 cone of radiation from the faceplate 26 so that, despite reflection and other losses, the system of FIG. 4 collects approximately 20 percent of the phosphor radiation emitted by the tube 24.

With an optical system such as that of FIG. 4 operating with the described high efficiency to collect such a large solid angle of light from all points of the faceplate 26 of the tube 24 the amount of required radiation from the phosphor layer 27 may be minimized. Hence, the thickness of the phosphor layer and the current of the reading electron beam also may be minimized. As a result of the relatively thin phosphor layer which is made possible, a minimal reduction in storage speed is effected. Also, the low current of the reading electron beam produces a minimal coloration of the target electrode, thereby increasing the image storage time in the cathodochromic layer 25 of the tube 24.

The optical apparatus of FIG. 4 is relatively compact and is considerably less expensive than a conventional optical system would be to effect only an *f*/2 cone of radiation from the cathode-ray tube 24. In one practical form, the chamber 34 is provided with a hinged door 34*a* which may be opened to provide access to the faceplate 26 of the tube 24 and to introduce light by which to completely erase the image stored in the cathodochromic layer 25. In one apparatus of the type shown in FIG. 4 the photomultipliers 39 and 41 were 5-inch RCA 04465 devices which have an S-20 response characteristic. This apparatus also is provided with shutters 44 and 45 in front of the respective photomultipliers 39 and 41 which are open during normal operation but are closed before opening the door 34*a* in order to protect the photomultipliers from the ambient or image-erasing light admitted through the door.

The main circuit elements of a system by which an optical subject is stored in a device of the character described with reference to FIGS. 2, 3 and 4 and by which substantially noise-free video signals are generated from the stored subject in accordance with this invention are shown in block diagram form in FIG. 5. A composite input television signal including a video component representing a subject and also including blanking and synchronizing pulses at commercial television rates, such as those set by the Federal Communications Commission for the United States, is impressed upon an input terminal 46 from which it is transferred to a gamma corrector 47. It is necessary to effect gamma correction only of the subject representative video signal component of the input signal. Therefore, the synchronizing and blanking pulse components of the input signal are separated from the composite signal in the gamma corrector 47 and appear at an output terminal 48. There is encountered a high degree of nonlinearity in the image-recording operation in the cathodochromic layer 25 of the cathode-ray tube 24 of FIG. 2, the initial coloration of this layer being effected with considerably less electron beam energy than is needed to complete the recording process. In order to obtain accurate gray scale reproduction of the recorded subject it is necessary that the gamma corrector 47 function to produce approximately the following relationship between the video signal at the input terminal 46 and the video signal derived from the gamma corrector at an output terminal 49:

$$E_{out}=(E_{in})^{6.0}$$

The gamma-corrected subject representative video signal derived from the gamma corrector output terminal 49 is impressed upon a signal amplifier and deflection generator 51 in which there is added to the video signal the synchronizing and blanking pulse components derived from the gamma corrector output terminal 48 to again constitute a composite television signal. After amplification and other processing (to be described later) of the composite television signal by the amplifier 51 it is impressed upon the input of the cathodochromic device 24*a* corresponding to the cathode-ray tube 24 of FIG. 2, the input of which is a beam intensity control electrode of the electron gun 29. In a particular form of the cathode-ray tube 24*a* used in a successfully operated embodiment of the invention an electron beam functioning at an ultor or final accelerating voltage of 26 kilovolts had a current intensity of approximately 500 microamperes for writing or recording an image of the subject and a current intensity of a maximum of 0.04 microamperes for readout of the recorded image. Such a current intensity change is accomplished by a read-write switch 52 connected to the amplifier 51.

It may be desirable, in order to produce higher contrast in the recorded image, to effect a multiple impression on the cathodochromic layer 25 of the tube 24 of the video signal derived from the gamma corrector terminal 49. In the apparatus of FIG. 5 such multiple recording is accomplished by suitable control of the amplifier 51 by a write timer 53 which counts a preselected number of vertical frames when the read-write switch 52 is in position to effect a writing control of the amplifier. Because of the desirability of using the described relatively low current intensity of the readout electron beam the apparatus of Fig. 5 is provided with a read timer 54 so that a multiple frame scansion of the recorded subject may be made when the read-write switch in in the read position.

The suitably amplified composite video signal voltage or the unmodulated voltage (depending upon the position of the read-write switch 52) is impressed upon the cathodochromic display tube 24*a* from which light representing the recorded subject plus the undesired noise effects is directed to the No. 1 photomultiplier 39*a* and light representing substantially only the noise effects is directed to the No. 2 photomultiplier 41*a* as described with reference to FIG. 4.

The composite video and noise effects signal developed at the output terminal 55 of the photomultiplier 39*a* is applied to a first input terminal 56 of a signal processing and correction amplifier 57, the main function of which is to detect the ratio of the composite signal and the noise effects signal. The signal representing substantially only the noise effects which is developed at the output terminal 58 of the photomultiplier 41*a* is applied to the input terminal 59 of a correction signal processing amplifier 61, the output terminal of which is connected through a correction signal gain control device 63 to a second input terminal 64 of the signal processing and correction amplifier 57. This amplifier also is provided with a clipping level control device 65 which functions to remove any DC level component which may result from the described limited signal modulation produced by the absorption of light from the phosphor layer 27 in the cathodochromic layer 25 of the tube 24 of FIG. 2. Additionally, the separated synchronizing and blanking pulses at the output terminal 48 of the gamma corrector 47 are recombined with the corrected video signal in the amplifier 57 by means of a connection including a synch gain control device 66. The amplifier, thus, produces at its output terminal 67 a corrected composite television signal representative of the image of the subject which is optically stored in the cathodochromic display tube 24*a*.

The signal derived from the amplifier 57 at its output terminal 67 is applied to an output read-write switch 68 which has an output terminal 69. With the switch 68 in its read position the corrected signal derived from the amplifier output terminal 67 and representative of the image stored in the cathodochromic display tube 24*a* is transferred to the terminal 69 from which it may be used to reproduce the stored image on a monitor or similar device. With the switch 68 in its write position the gamma-corrected video signal developed at the output terminal 49 of the gamma corrector 47 is transferred to the terminal 69 so that the video signal by which the cathodochromic layer 25 of the tube 24 of FIG. 2 is to be bombarded may be monitored.

Figure 6:
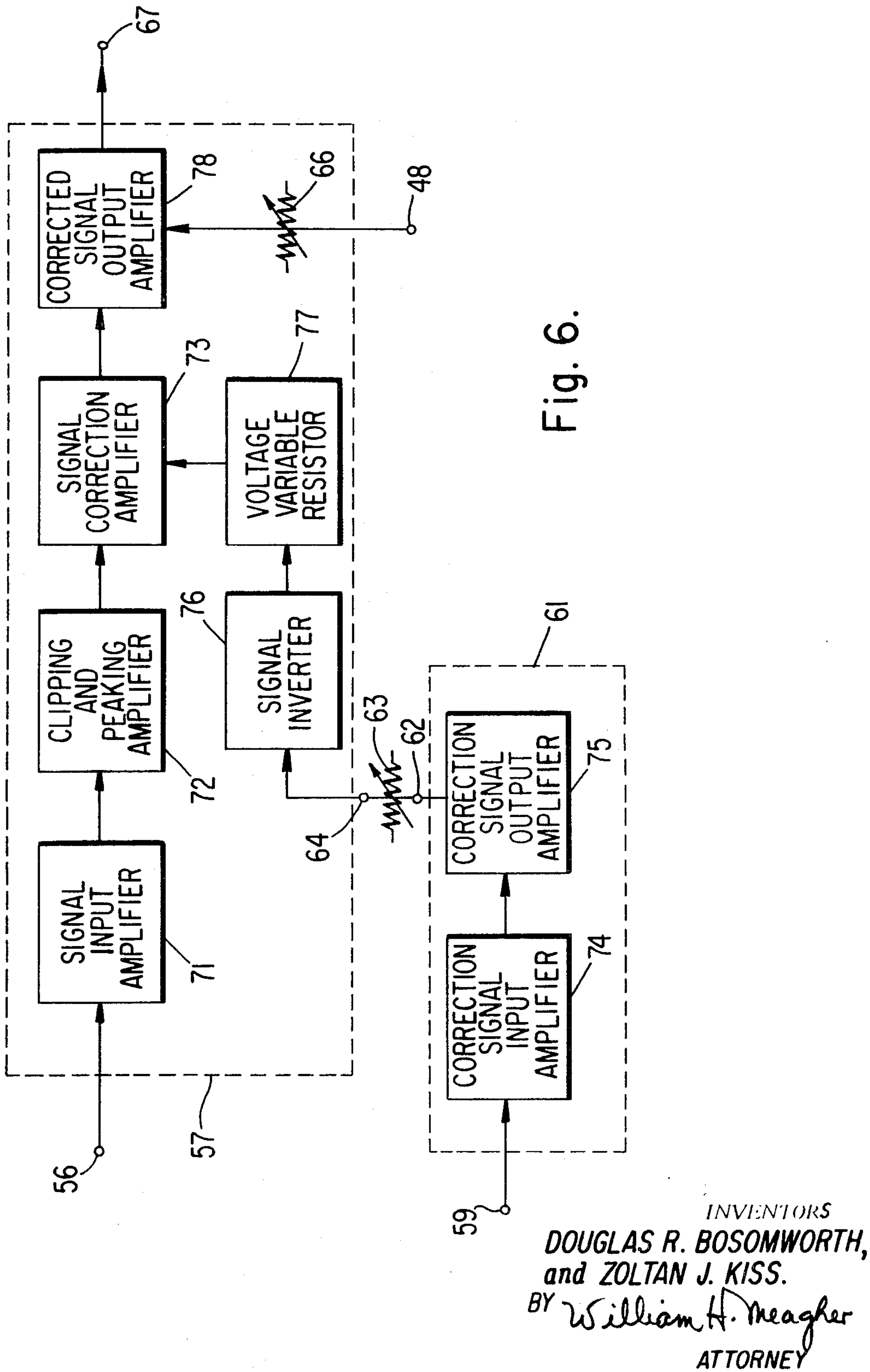
FIG. 6 is a block diagram showing the relationship of components of the signal processing amplifiers of FIG. 5.

FIG. 6 represents, in block diagram form, the main elements of the signal processing and correction amplifier 57 and of the correction signal processing amplifier 61 of FIG. 5. The composite video and noise effects signal present at the input terminal 56 of the amplifier 57 is applied through a series arrangement of an input amplifier 71 and a clipping and peaking amplifier 72 to a signal correction amplifier 73 which functions as the previously described ratio detector. The noise effects signal present at the input terminal 59 of the correction signal processing amplifier 61 is transferred through a series arrangement of an input amplifier 74 and an output amplifier 75 to its output terminal 62. In the further transfer of the noise effects signal from the output terminal 62 to the second input terminal 64 of the amplifier 57 its amplitude is adjusted by the control device 63 to correspond substantially to the amplitude of the noise effects component of the composite signal derived from the clipping and peaking amplifier 72. In the amplifier 57, after a polarity reversal of the noise effects signal at the input terminal 64 by a signal inverter 76 and its passage through a voltage variable resistor 77, such signal is applied to the signal correction amplifier 73. As previously described, this amplifier functions as a ratio detector to produce a video signal which is substantially free of any noise effects which may be produced by the illumination of the cathodochromic layer 25 by the electron beam excitation of the phosphor layer 27 of the tube 24 of FIG. 2. Such a signal is applied to a corrected signal output amplifier 78 to which also is applied the synchronizing and blanking pulses from the gamma corrector output terminal 48 of FIG. 5 in proper amplitude which is controlled by the gain control device 66. Thus, there is produced at the output terminal 67 of the amplifier the desired composite television signal substantially devoid of any undesirable noise effects.

FIGS. 7 and 8 show the circuit details of one successfully operated arrangement embodying the invention. In FIG. 7 the noise effects representative signal derived from the photomultiplier 41*a* of FIG. 5 is impressed upon the input terminal 59 of the correction signal processing amplifier 61 at about 10 millivolts from which it is applied to the correction signal input amplifier in the form of an integrated circuit 74*a* which multiplies it by a factor of approximately 100 and from which it is applied to a low-impedance drive transistor 75*a* and thence to the output terminal 62.

In FIG. 8 the composite video and noise effects representative signal derived from the photomultiplier 39*a* of FIG. 5 is impressed upon the input terminal 56 of the signal processing and correction amplifier 57 at about 10 millivolts from which it is applied to the signal input integrated circuit amplifier 71*a* which increases its amplitude by a factor of approximately 100. This amplified signal is then clipped and peaked by the PNP-transistor amplifier 72*a* and its associated circuit components. The clipping level is adjusted by means of the voltage applied to terminal 65 which, through the voltage divider resistors 65*a* and 65*b*, controls the biasing of the base electrode of the transistor 72*a*. The signal peaking is effected by means of the collector electrode load that includes an inductor 79 which produces an additional signal gain in the 3 to 4 mHz., region of its frequency spectrum.

The signal correction NPN-transistor amplifier 73*a*, to which the clipped and peaked composite video signal derived from the amplifier transistor 72*a* is applied, functions to provide a variable gain of this signal under the control of the noise effect signal derived from the output terminal 62 of the amplifier 61 of FIG. 7 and applied to the second input terminal 64 of the amplifier 57 of FIG. 8. The NPN-Transistor 76*a* serves as a signal inverter, the output of which is applied to the gate electrode of a field effect transistor 77*a*. The source and drain electrodes of this transistor are connected in the emitter circuit of the signal correction transistor 73*a* and serve effectively as a variable emitter resistor which varies the gain of the amplifier transistor 73*a* as a substantially linear function of the noise effects signal applied to the terminal 64, thereby providing the described ratio detection and the approximate correction of the composite video signal desired. The corrected signal derived from the correction amplifier transistor 73*a* finally is applied to the output terminal 67 by an output NPN-transistor amplifier 78*a*, in the collector electrode circuit of which is injected the separated synchronizing and blanking pulses from the output terminal 48 of the gamma corrector 47 of FIG. 5.

What is claimed is:

1. In a system for generating a video signal representative of an optically recorded subject by directing light through said subject from a source of illumination, apparatus for improving the signal-to-noise ratio of the generated video signal by effectively eliminating from said generated video signal undesired noise effects inadvertently produced by the light derived from said source of illumination, said apparatus comprising:

first detector means responsive to light directed through said subject from said source of illumination to produce a first signal including said desired video signal representative of said subject and an undesired noise signal produced by the light derived from said source of illumination;

second detector means responsive to light from said source of illumination substantially unaffected by said subject to produce a second signal representative of said noise signal to the substantial exclusion of said video signal; and third detector means responsive to substantially equivalent bandwidths of said first and second produced signals to detect the ratio of said first and second signals to produce an output signal including substantially only said desired video signal.

2. Apparatus as defined in claim 1, wherein:

said source of illumination comprises a cathode ray tube having a faceplate and including;

a target electrode having a layer of phosphor material located behind said faceplate and capable of emitting light through said faceplate having a given frequency spectrum when excited by an electron beam; and means for scanning said phosphor layer with an unmodulated reading electron beam to produce substantially uniform light emission from all scanned portions of said electrode.

3. Apparatus as defined in claim 2, and also having an optical system including:

a semireflecting mirror to transmit a first portion of the light from said cathode-ray tube target electrode to said first detecting means and to reflect a second portion of the light from said cathode-ray tube target electrode to said second detecting means.

4. In a system for generating a video signal representative of an optically recorded subject from a source of illumination, said source of illumination comprising a cathode-ray tube having a faceplate and including a target electrode having a layer of phosphor material behind said faceplate and capable of emitting light through said faceplate having a given frequency spectrum when excited by an electron beam, and means for scanning said phosphor layer with an unmodulated reading electron beam to produce substantially uniform light emission from all scanned portions of said electrode; apparatus for improving the signal-to-noise ratio of the generated video signal by effectively eliminating from said generated video signal undesired noise effects inadvertently produced by the light derived from said source of illumination, said apparatus comprising:

first detector means responsive to light directed through said subject from said source of illumination to produce a first signal including said desired video signal produced by the light derived from said source of illumination;

second detector means responsive to light from said source of illumination substantially unaffected by said subject to produce a second signal representative of said noise signal to the substantial exclusion of said video signal;

an optical system including a semireflecting mirror to transmit a first portion of the light from said cathode-ray tube target electrode to said first detecting means and to reflect a second portion of the light from said cathode-ray tube target electrode to said second detecting means;

third detector means responsive to said first and second produced signals to detect the ration of said first and second signals to produce an output signal including substantially only said desired video signal;

said semireflecting mirror being a dichroic device which transmits a first portion of light having a first frequency spectrum and reflects said second portion of light having a second frequency spectrum.

5. Apparatus as defined in claim 4, wherein:

said optically recorded subject is a photographic transparency located between said dichroic device and said first detector means, whereby said first portion of light transmitted to said first detector means includes both the subject-representative light and the light representing the undesired noise effects derived from said cathode-ray tube target electrode, and said second portion of light reflected to said second detector means represents only the undesired noise effects derived from said cathode-ray tube target electrode.

6. Apparatus as defined in claim 4, wherein:

said optically recorded subject includes a layer of cathodochromic material within said cathode-ray tube and located between said faceplate and said layer of phosphor material; and means for scanning said cathodochromic layer with a video signal-modulated writing electron beam to store in said cathodochromic layer an image desired for display.

7. Apparatus as defined in claim 6, wherein:

said video signal-modulated writing electron beam is of a relatively high current intensity sufficient to penetrate said phosphor layer and to bombard said cathodochromic layer; and said cathodochromic material has the property of being normally white and of changing color under bombardment by said writing electron beam, the induced optical density of said color changes being proportional to said video signal modulation of said writing electron beam, and of persisting after cessation of said writing electron beam bombardment, whereby to store in said cathodochromic layer an image represented by said video signal modulation of said writing electron beam.

8. Apparatus as defined in claim 7, wherein:

said cathodochromic material is of a character to have an induced absorption band peaking at a frequency which determines the color and the stored image; and the given frequency spectrum of said phosphor layer includes the peak induced absorption band frequency of said cathodochromic layer so that the uniform light radiation produced by said scansion of said phosphor layer by said unmodulated reading electron beam is absorbed in said cathodochromic layer in direct proportion to said induced optical density of respective points of said cathodochromic layer, whereby to produce light emission external of said cathode-ray tube which is inversely proportional to said stored image.

9. Apparatus as defined in claim 8, wherein:

said unmodulated reading electron beam is of a relatively low current intensity sufficient only to excite said phosphor layer to produce said uniform light emission without penetrating it to bombard said cathodochromic layer; and the given frequency spectrum of said phosphor material extends outside of the induced absorption frequency band of said cathodochromic material.

10. Apparatus as defined in claim 9, wherein:

said dichroic device is of a character to transmit light having the peak induced absorption band frequency of said cathodochromic layer and to prevent the transmission of light having frequencies outside of the induced absorption frequency band of said cathodochromic layer, and said dichroic device also being of a character to reflect light having frequencies outside of the induced absorption frequency band of said cathodochromic layer.

11. Apparatus as defined in claim 10, wherein:

said first and second detector means respectively comprise first and second photomultipliers.

12. Apparatus comprising the combination of:

a cathode-ray tube having a faceplate; a layer of cathodochromic material on the inside of said faceplate for storing an image; a phosphor layer overlying said cathodochromic layer, said phosphor layer being subject to the production of light over a frequency spectrum encompassing at least a portion of the effective induced absorption frequency band of said cathodochromic layer and additionally encompassing frequencies lying outside said effective absorption band; and electron beam source; and beam deflection means for tracing a scanning raster on the inside of said faceplate with an electron beam from said source;

means for selectably altering the mode of operation of said cathode-ray tube between a write mode in which said beam is of a relatively high current intensity and modulated in accordance with video input signals representative of an image to be stored, and a read mode in which said beam is of a relatively low current intensity and substantially unmodulated;

frequency-selective optical means disposed to receive light transmitted through said faceplate during operation of said cathode-ray tube in said read mode for directing components of said transmitted light having frequencies falling within said absorption band to a first light path and for directing components of said transmitted light having frequencies falling within said frequency spectrum of light production by said phosphor layer but lying outside said effective absorption band to a second light path;

first light-detecting means disposed in said first light path for generating a first signal;

second light-detecting means disposed in said second light path for generating a second signal;

and means coupled to said first and second light detecting means for modifying said first signal in response to said second signal to provide a corrected output signal.

13. Apparatus in accordance with claim 12 wherein said frequency-selective optical means comprises a dichroic semireflecting mirror.

* * * * *